(12) United States Patent
Metsala et al.

(10) Patent No.: US 10,924,470 B2
(45) Date of Patent: Feb. 16, 2021

(54) SECURED NETWORK ARCHITECTURE

(71) Applicant: NOKIA SOLUTIONS AND NETWORKS OY, Espoo (FI)

(72) Inventors: Esa Markus Metsala, Espoo (FI); Heikki-Stefan Almay, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 922 days.

(21) Appl. No.: 14/780,785

(22) PCT Filed: Mar. 27, 2013

(86) PCT No.: PCT/EP2013/056541
§ 371 (c)(1),
(2) Date: Sep. 28, 2015

(87) PCT Pub. No.: WO2014/154264
PCT Pub. Date: Oct. 2, 2014

(65) Prior Publication Data
US 2016/0057121 A1   Feb. 25, 2016

(51) Int. Cl.
*H04L 29/06* (2006.01)
*H04W 12/06* (2021.01)
*H04L 9/32* (2006.01)

(52) U.S. Cl.
CPC ........ *H04L 63/0823* (2013.01); *H04L 9/3263* (2013.01); *H04L 63/08* (2013.01);
(Continued)

(58) Field of Classification Search
None
See application file for complete search history.

(56) References Cited

U.S. PATENT DOCUMENTS

| | | | | |
|---|---|---|---|---|
| 8,341,717 | B1* | 12/2012 | Delker | H04L 63/20 705/56 |
| 2008/0076425 | A1* | 3/2008 | Khetawat | H04W 88/12 455/436 |

(Continued)

OTHER PUBLICATIONS

International Search Report and Written Opinion dated Jun. 24, 2013 corresponding to International Patent Application No. PCT/EP2013/056541.

(Continued)

*Primary Examiner* — Jeffrey L Williams
(74) *Attorney, Agent, or Firm* — Squire Patton Boggs (US) LLP

(57) ABSTRACT

A secure storage for an X.509v3 digital certificate is provided (301, 302). Ports of a first and second apparatus (101, 102) are mutually authenticated (303) by using 802.1X based authentication and 802.1AR certificates. Traffic types are divided (304, 305) by an operator-configurable selector function into user plane, control plane, synchronization plane, and management plane traffic types. For Ethernet transport a virtual port is created for each traffic type, and a different MACsec secure connectivity association is created for each virtual port. For Ethernet transport an operator-programmable security policy is maintained for each traffic type. For IP transport an IPsec security association is created for each traffic type, and an operator-programmable security policy is maintained for each security association. For IP transport, TLS support may be enabled for compatibility with network management traffic. A port is repeatedly re-authenticated by an operator-definable timer value.

20 Claims, 5 Drawing Sheets

(52) U.S. Cl.
CPC ....... *H04W 12/0609* (2019.01); *H04L 63/162* (2013.01); *H04L 63/164* (2013.01); *H04L 2209/24* (2013.01); *H04L 2209/64* (2013.01)

(56) References Cited

U.S. PATENT DOCUMENTS

| | | | | |
|---|---|---|---|---|
| 2008/0123652 | A1* | 5/2008 | Akyol | H04L 12/4633 370/392 |
| 2008/0126559 | A1* | 5/2008 | Elzur | H04L 63/0464 709/232 |
| 2009/0276830 | A1* | 11/2009 | O'Connor | H04L 63/0428 726/3 |
| 2010/0115316 | A1* | 5/2010 | Diab | H04L 12/12 713/323 |
| 2012/0246466 | A1 | 9/2012 | Salvarani et al. | |
| 2013/0132541 | A1* | 5/2013 | Falk | G06Q 10/087 709/222 |
| 2013/0329743 | A1* | 12/2013 | Gai | H04L 29/08702 370/400 |
| 2016/0036813 | A1* | 2/2016 | Wakumoto | H04L 63/0272 713/171 |
| 2016/0043996 | A1* | 2/2016 | Syed Mohamed | H04L 63/20 726/1 |

OTHER PUBLICATIONS

Khan Ferdous Wahid, "Rethinking the link security approach to manage large scale Ethernet network," Local and Metropolitan Area Networks (LANMAN), 2010 17th IEEE Workshop, May 5, 2010, pp. 1-6, XP031706924.

IEEE Standard for a Precision Clock Synchronization Protocol for Networked Measurement and Control Systems, IEEE Instrumentation and Measurement Society, IEEE Std. 1588-2008 (Revision of IEEE Std 1588-2002), Jul. 24, 2008, 289 pages.

3GPP TS 33.310 V11.2.0 (Dec. 2012), Technical Specification, 3rd Generation Partnership Project; Technical Specification Group services and System Aspects; Network Domain Security (NDS); Authentication Framework (AF) (Release 11), Dec. 2012, 54 pages.

* cited by examiner

SECURED NETWORK ARCHITECTURE

FIELD OF THE INVENTION

The exemplary and non-limiting embodiments of this invention relate generally to wireless communications networks, and more particularly to providing a secured network architecture.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

IEEE 802.1X is a standard for port-based network access control (PNAC). It provides an authentication mechanism to devices wishing to attach to a LAN or WLAN. IEEE 802.1AE (MACsec) is a standard for MAC security, defining connectionless data confidentiality and integrity for media access independent protocols. IPsec (internet protocol security) is a protocol suite for securing IP communications by authenticating and encrypting IP packets of a communication session. IPsec includes protocols for mutual authentication between devices at the beginning of a session and negotiation of cryptographic keys to be used during the session.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, computer program product, and a computer-readable storage medium as defined in the independent claims. Further embodiments of the invention are disclosed in the dependent claims.

An aspect of the invention relates to a method for providing network security in a communications system, the method comprising providing, in a first apparatus and in a second apparatus, a secure storage for an X.509v3 digital certificate; mutually authenticating ports of the first apparatus and the second apparatus by using IEEE 802.1X port based authentication and IEEE 802.1AR secure device identity certificates, wherein the amount of MAC addresses is limited to a configurable number per port in the first apparatus and the second apparatus; dividing traffic types by means of an operator-configurable selector function in at least one of user plane, control plane, synchronization plane, management plane and/or a further traffic type; wherein for Ethernet transport the method comprises creating a virtual port for each selected traffic type; creating a different MACsec secure connectivity association CA for each virtual port; maintaining an operator-programmable security policy for each of the selected traffic types; repeatedly re-authenticating a port by means of an operator-definable timer value.

A further aspect of the invention relates to a method for providing network security in a communications system, the method comprising providing, in a first apparatus and in a second apparatus, a secure storage for an X.509v3 digital certificate; mutually authenticating ports of the first apparatus and the second apparatus by using IEEE 802.1X port based authentication and IEEE 802.1AR secure device identity certificates, wherein the amount of MAC addresses is limited to a configurable number per port in the first apparatus and the second apparatus; dividing traffic types by means of an operator-configurable selector function into at least one of user plane, control plane, synchronization plane, management plane and/or a further traffic type; wherein for IP transport the method comprises authenticating the first and second apparatus by using an IPsec IKE protocol and a X.509v3 digital certificate; creating an IPsec security association for each selected traffic type; maintaining an operator-programmable security policy for each of the security associations; repeatedly re-authenticating a port by means of an operator-definable timer value; wherein, if MACsec protocol is used, the encryption layer is a MAC layer, and, if IPsec protocol is used, the encryption layer is an IP layer.

A still further aspect of the invention relates to a first apparatus comprising at least one processor; and at least one memory including a computer program code, wherein the at least one memory and the computer program code are configured to, with the at least one processor, cause the first apparatus to provide a secure storage for an X.509v3 digital certificate; mutually authenticate ports of the first apparatus and a second apparatus by using IEEE 802.1X port based authentication and IEEE 802.1AR secure device identity certificates, wherein the amount of MAC addresses is limited to a configurable number per port in the first apparatus and in the second apparatus; divide traffic types by means of an operator-configurable selector function into at least one of user plane, control plane, synchronization plane management plane and/or a further traffic type; wherein for Ethernet transport the at least one memory and the computer program code are configured to, with the at least one processor, cause the first apparatus to create a virtual port for each selected traffic type; create a different MACsec secure connectivity association CA for each virtual port; maintain an operator-programmable security policy for each of the selected traffic types; repeatedly re-authenticate a port by means of an operator-definable timer value.

A still further aspect of the invention relates to a second apparatus comprising at least one processor; and at least one memory including a computer program code, wherein that the at least one memory and the computer program code are configured to, with the at least one processor, cause the second apparatus to provide, in a first apparatus and in the second apparatus, a secure storage for an X.509v3 digital certificate; mutually authenticate ports of the first apparatus and the second apparatus by using IEEE 802.1X port based authentication and IEEE 802.1AR secure device identity certificates, wherein the amount of MAC addresses is limited to a configurable number per port in the first apparatus and the second apparatus; divide traffic types by means of an operator-configurable selector function into at least one of user plane, control plane, synchronization plane, management plane and/or a further traffic types; wherein for IP transport the at least one memory and the computer program code are configured to, with the at least one processor, cause the second apparatus to authenticate the first and second apparatus by using an IPsec IKE protocol and a X.509v3 digital certificate; create an IPsec security association for each selected traffic type; maintain an operator-programmable security policy for each of the security associations; repeatedly re-authenticate a port by means of an operator-definable timer value; wherein, if MACsec protocol is used, the encryption layer is a MAC layer, and, if IPsec protocol is used, the encryption layer is an IP layer.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
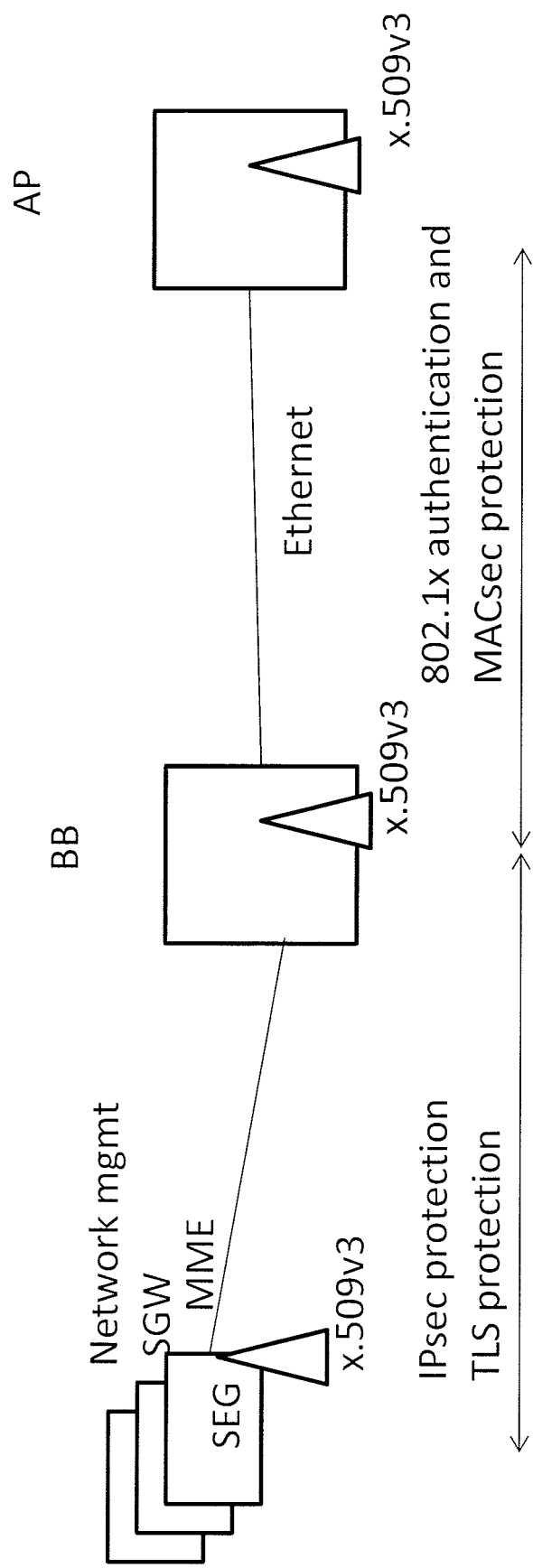
FIG. 1 illustrates protecting an Ethernet based fronthaul by IEEE 802.1x mutual authentication and MACsec.

A term fronthaul refers to connectivity between an access point (RF unit) and a central baseband unit in LTE/HSPA mobile network architecture. An exemplary embodiment addresses security and protection of fronthaul transport in an adaptable way that meets different use cases existing in both BB/AP functional division, and in fronthaul topology.

For backhaul, IPsec may be mandated in cases where the network access is not physically protected. For the fronthaul, the situation is different. Current 3GPP standards do not define the fronthaul characteristics. Also, the functional division between AP and BB is subject to vendors and/or further standardization. AP may be an IP host having an IP address, network management connection, and a control processor. It may as well be a simpler element with less control and management plane capabilities, and, in networking layers, operate only on the Ethernet layer. In both of these cases, fronthaul represents vulnerability.

Ethernet is well suited for implementation of the fronthaul. It is a high volume low cost technology. Standard Ethernet ports are available at the high speeds needed for fronthaul (1 Gbit/s, 10 Gbit/s, 40 Gbit/s, 100 Gbit/s and beyond). Different transport media (fibre, copper and microwave) are supported. Ethernet is also widely available as a transport service. Data rates for OBSAI are approximately multiples of 768 Mbit/s, and for CPRI approximately multiples of 614 Mbit/s. A standard draft exists in carrying these with Ethernet framing. Depending on Ethernet switch latencies, and on functional split, it is as well feasible to use Ethernet switches within the fronthaul for connecting multiple APs. The fronthaul presents a security vulnerability on each protocol layer, especially on the Ethernet (MAC) layer and on the (potential) IP layer.

Original Ethernet standards, as well as many other standards from the same era, do not address security threats. Security in LAN and in the mobile backhaul has since been addressed and solutions exist. In the mobile backhaul application, when Ethernet is used as the layer below the IP layer, the IP layer remains protected when IPsec is used. However, IPsec cannot protect resources of the underlying layer. Even if IP connectivity is not available, it may be possible to access the Ethernet port. Furthermore, if the Ethernet port is connected to a bridged LAN, the Ethernet port provides access for each station connected to the same LAN. This is true both for the Ethernet service and for native (bridged) Ethernet. A simple attack may cause flooding of Ethernet frames, leading to a denial of service. In existing systems, Ethernet security is not widely used in the mobile backhaul or wired transmission in general. Ethernet security is common in WLANs.

As the bridging and MAC address learning capability allows connecting new LAN stations to the LAN and forwarding the Ethernet frames with the learning capability without explicit configuration required, Ethernet inherently supports communication between LAN stations on the same LAN.

With redundant Ethernet topologies, a spanning tree protocol within the bridging function enforces an active forwarding topology by first selecting one bridge to act as a root bridge, and then selecting a port in each LAN segment to be in active forwarding state. An example of a security threat is that if a rogue bridge is added and configured to claim the root bridge role, Ethernet frames may be directed to the attacker.

Examples of possible attacks include 1) a DoS attack: traffic may be flooded, either as broadcast frames, or as control traffic; control frames, such as spanning tree BPDUs or other Ethernet control protocols, need processing and may overload network elements; 2) attacking the spanning tree protocol (which may be needed in the customer sites for redundancy): when spanning tree was initially developed, security vulnerabilities were not considered; the spanning tree protocol is not authenticated; 3) ARP poisoning: similarly as for the spanning tree, ARP protocol vulnerabilities were not considered at the time of the design, and ARP is not authenticated either; as well, each station connected to a virtual LAN (VLAN) learns the IP/MAC address mapping; as each station also receives ARP requests and responses due to the broadcast nature, they also need to process it.

These risks may result in a network being unavailable for any legitimate use, even though IPsec is deployed on the layer above the Ethernet layer.

Security at the Ethernet Layer

IEEE 802.1X, port based authentication, specifies authentication such that granting access to the port is dependent on successful authentication using EAP (extensible authentication protocol). EAP is carried directly in the Ethernet frames (EAPOL (EAP-over-LAN)). Authentication defined in IEEE 802.1X may be based on multiple types of credentials, including user names, simple passwords, or cryptographic credentials. IEEE 802.1AR, Secure device identity, defines cryptographic credentials for the purpose of usage with IEEE 802.1X. An encryption service at the Ethernet MAC layer is defined in IEEE 802.1ae. The services, port based authentication with secure device identity, and encryption using MACsec may be used to protect the Ethernet layer, in case of deployment of Ethernet lines in the fronthaul as well.

As mentioned above, in existing systems, security is not addressed at the Ethernet MAC layer in the mobile backhaul or wired networking in general. An implementation of the above protocols alone is not a feasible solution for the fronthaul e.g. for the following reasons: 1) high capacity needs; implementing IEEE 802.1x and MACsec for the fronthaul means a high capacity processing engine needed for the MACsec cryptography; this increases the costs both for AP and BB as well as power consumption due to more processing cycles needed; 2) link by link encryption/decryption adds delay to the fronthaul; with tight delay/jitter budget of OBSAI/CPRI this may reduce the span of a fronthaul network considerably; 3) MACsec is link by link, meaning that in case of multiple links (connection to a switch and then to another one in a chain fashion), MACsec decryption/encryption is needed multiple times, again increasing the complexity and cost; 4) port-based access control after successful opening of the port may allow other devices to use the controlled port, unless restricted, thus creating security vulnerability; 5) the protocol suite mentioned is not necessarily commonly available in commercial switches at least yet.

Security with IPsec

3GPP mandates the use of IPsec for protecting LTE backhaul. Similarly, IPsec may be used for the fronthaul, naturally with the assumption that the IP layer is present in the protocol stack. This is not necessarily true when CPRI/OBSAI is mapped to Ethernet, or if traffic between BB and AP uses Ethernet frames but by means other than CPRI/OBSAI. This is as well a feasible alternative, since the interface between BB and AP is not defined by current 3GPP standards, and thus implementations may use Ethernet framing without CPRI/OBSAI e.g. by mapping user, control, synchronization, or management plane traffic directly into Ethernet frames. When the IP layer is present, IPsec may be used for the fronthaul protection. IPsec supports authentication of the endpoints (IKE and X.509v3 certificates), encryption, integrity and anti-replay protection. IPsec is assumed to be used for the backhaul. For the fronthaul using IPsec introduces e.g. following limitations: 1) the underlying layer (Ethernet) remains vulnerable, even if IPsec is deployed (see the above mentioned Ethernet threats); thus IEEE 802.1X is anyway needed, which already means support for EAP-TLS and related functions; 2) the IP layer is not necessarily present in the protocol stack, which would need to be added, making the device more complex than a simple Ethernet AP; solving this by adding an IP layer for the purpose of IPsec protection is possible, but includes complexity, since protection may be needed for the Ethernet layer anyway (as explained in the previous point "1").

An exemplary embodiment provides a fronthaul security architecture including components and configuration options that make the solution adaptable to the different fronthaul cases, for example, for a case where the fronthaul based solely on Ethernet (no IP layer present), for a case where the fronthaul is based on IP, or for a combination where some traffic types such as management traffic uses an IP stack, but user and control traffic are mapped directly to Ethernet frames (or any other combination of selecting traffic to be mapped either to Ethernet frames or to IP packets).

An exemplary embodiment divides the fronthaul traffic into one or more of traffic types that may require different solutions for protecting the traffic. Examples of these traffic types include user plane traffic, control plane traffic, synchronization plane traffic, and management plane traffic. An exemplary embodiment may also involve division of the fronthaul traffic into one or more further traffic types, or division of certain traffic type into finer granularity subtypes. These traffic types may have different vulnerabilities that may be addressed by selecting a suitable protection layer (Ethernet layer, IP layer, application layer, or transport layer TLS) and protection coverage (encryption, integrity, anti-replay, etc).

User plane traffic (L1 data stream) is encrypted by mobile (3GPP) air interface standards, both in LTE and HSPA, so the fronthaul is protected assuming that the functional split is such that this belongs to BB (PDCP layer in LTE) or even to RNC (PDCP layer of 3G HSPA). In this case, an additional encryption service provides little value and is not to be used as it increases the delay of the fronthaul network. The user plane traffic is by far the biggest part of the traffic. So there is a cost associated to the high speed encryption/decryption.

Control plane traffic refers to internal vendor specific communication that is needed between BB and AP, or potentially in the future to be standardized control plane signalling, and may consist e.g. of operational state commands, alarms, resets, etc. Carrying these messages in cleartext is a threat that is to be addressed.

Synchronization plane traffic refers to a way of carrying timing information to AP. Synchronization may be arranged in different ways depending on the requirements of the radio access technology and BB-AP functional division. An exemplary protocol for synchronization is IEEE1588-2008 (precision time protocol).

Management plane traffic refers to network management connectivity from AP to a central network management system or a related mediator element. If AP includes a network management channel, this may need to be protected (encrypted and integrity protected, authenticated).

In an exemplary embodiment network elements (AP and BB) are mutually authenticated in each case to limit access to the fronthaul for legitimate and identified network elements. Authentication may be based on digital X.509 v3 certificates, although in general other types of credentials may be used as well, such as passwords. The X.509v3 certificate format may be selected as to meet the requirements of both IEEE 802.1AR secure device identity and 3GPP defined profile for IPsec, and used for TLS as well. In this way a single certificate may be used as the authentication credential for the Ethernet port based authentication, for the IPsec IKE authentication, and for TLS, which simplifies the deployment in cases where both Ethernet and IP layer authentication and possibly TLS authentication is needed using digital certificates.

With Ethernet transport, an exemplary secured fronthaul network architecture may be based on a secure storage for X.509v3 digital certificate both in BB and APs and when applicable in intermediate fronthaul switches and other transport equipment. With Ethernet transport, the architecture may be based on mutually authenticating the ports of AP and BB using IEEE 802.1X and digital certificates (IEEE 802.1AR), and additionally limiting the amount of MAC addresses to a configurable number, per port, on both AP and on BB. When intermediate fronthaul switches are used, trunk links between BB and switches as well as trunk links between switches are mutually authenticated. When switches are used the AP port authentication is performed by the switches. With Ethernet transport, the architecture may be based on dividing the traffic types by an operator configurable selector function into e.g. user, control, synchronization, and management plane. With Ethernet transport, the architecture may be based on creating virtual ports one for each traffic type. With Ethernet transport, the architecture may be based on creating different MACsec secure connectivity associations (CAs) for each of the virtual ports. With Ethernet transport, the architecture may be based on having an operator programmable security policy for each of the traffic types, including selection of encryption support (including null encryption, mainly intended for user plane) and optionally selection of integrity protection and its method. With Ethernet transport, the architecture may be based on repeatedly re-authenticating the port by a timer value configurable by the operator.

With IP transport, an exemplary secured fronthaul network architecture may be based on a secure storage for X.509v3 digital certificate in both BB and APs. The X.509v3 certificate may serve the port based authentication, IPsec, and TLS. With IP transport, the architecture may be based on mutually authenticating the ports of AP and BB using IEEE 802.1X and digital certificates (IEEE 802.1AR), and additionally limiting the amount of MAC addresses to a configurable number, per port, on both AP and on BB. When intermediate fronthaul switches or other transport equipment are used, trunk links between BB and switches as well as trunk links between switches (or other elements) are mutually authenticated. When switches are used, the AP port authentication is performed by the switches. With IP transport, the architecture may be based on dividing the traffic types by an operator configurable selector function into e.g. user, control, synchronization, and management plane. With IP transport, the architecture may be based on authenticating the endpoints with X.509v3 certificates and IKE, and (subsequently) creating IPsec SAs for each traffic type. With IP transport, the architecture may be based on having an operator programmable security policy for each of the SAs, including selection of the encryption (including null encryption, intended for the user plane) and optionally selection of the integrity protection and its method. With IP transport, the architecture may be based on having a possibility for TLS support e.g. for compatibility with network management traffic and/or for other traffic types. For network management traffic, also other secure protocols may be used. With IP transport, the architecture may be based on repeatedly re-authenticating the port by a timer value configurable by the operator. With IP transport, the architecture may additionally be based on selection of a configuration of the protecting layer (for encryption, for integrity protection, and/or for anti-replay protection) to be either a MAC layer (with MACsec), the IP layer (with IPsec), or TLS, or other secure protocols in case of network management traffic.

In an exemplary embodiment, in addition to or instead of Ethernet layer protection (IEEE standards)/IP layer protection (IPsec), also TLS (transport layer security) may be utilized. Thus the protection layer for each of the traffic types may be selected to be Ethernet layer protection, IP layer protection, or a high layer protection (e.g. via TLS).

An exemplary selection logic may be as follows: 1) identifying and separating traffic types, e.g. user plane, control plane, synchronization plane, and management plane; 2) selecting a protection layer for each of the traffic types to be Ethernet layer, IP layer, or higher layer (e.g. via TLS); 3) selecting security policy for each traffic type, e.g. integrity protection, confidentiality protection, anti-replay protection, and selecting appropriate cryptographic algorithms.

Thus in an exemplary embodiment, the elements are first authenticated before setting up the protection between the Ethernet ports and possibly the IPsec endpoints, and possibly between applications (e.g. via TLS).

This allows e.g. an architecture where the port is authenticated (network elements mutually authenticate with X.509v3 certificates). Network management traffic of AP (if existing) is protected, e.g. by TLS. The user plane traffic is not encrypted, due to 3GPP encryption. The control plane traffic is directed either into MACsec CA or into IPsec SA, and is thus cryptographically protected. The synchronization plane is not necessarily protected, or it may be integrity protected only.

It may be possible as well to protect also management traffic up to BB via MACsec, in case AP attaches directly to BB, and then have each TLS and IPsec functionality only at BB, which again simplifies the AP implementation, without compromising security. In this architecture, AP only supports IEEE 802.1X, 802.1AR and 802.1AE, and the whole IP layer protection with IPsec, and possibly TLS, is implemented to BB. AP may thus be a simple low cost terminal.

If the functional split includes PDCP termination at AP, additionally the related user plane L1 stream may be encrypted, e.g. with a high speed MACsec silicon implementation.

The architecture further allows a combination of MACsec and IPsec such that MACsec is the main protection in the fronthaul, while IPsec SA may then protect the traffic within the backhaul. This may be more cost efficient due to low cost MACsec compared to IPsec implementations.

FIG. 1 illustrates an architecture in which an Ethernet based fronthaul is protected by IEEE 802.1x mutual authentication and MACsec (integrity and/or confidentiality). The backhaul is protected by IPsec and TLS. AP may comprise a simple terminal.

An exemplary embodiment enables optimizing processing requirements for AP and BB, while still mitigating fronthaul vulnerabilities. An implementation where the elements are mutually authenticated each time using cryptographic credentials but where only the vulnerable traffic is encrypted (control/management plane) leads to lower processing requirements and lower costs than a straightforward implementation of either MACsec or IPsec encryption for the whole traffic. The security policy defines which traffic type is protected and whether the protection includes integrity protection, confidentiality protection, or both.

With a selector logic e.g. control plane messaging between BB and AP may be protected; possibly this messaging is of low volume, and thus the encryption may optionally be done by processor SW rather than by dedicated HW. This would not be possible, if the whole traffic underwent the encryption/decryption operation. Similarly, integrity protection may be configured.

With the selection of either MACsec or IPsec encryption, the architecture complies with following use cases. In case AP attaches directly to BB (single hop as in FIG. 1), MACsec is used for simpler AP and faster power-on operation (no IKE signalling, no building of IPsec SAs, etc). In case AP attaches via an external switch or multiple switches to BB, IPsec is used to overcome multiple encryption/decryption operations.

Figure 2:
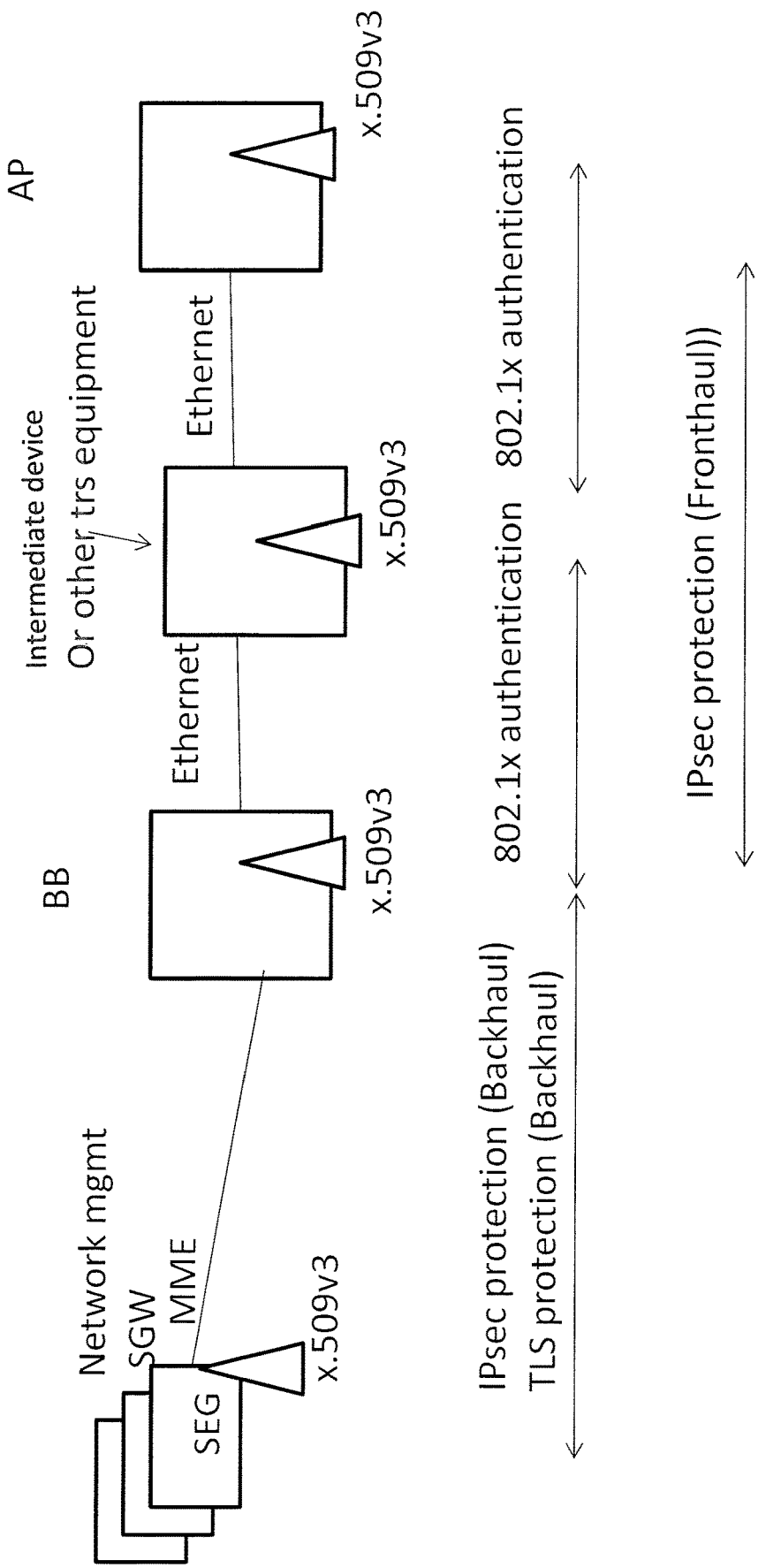
FIG. 2 illustrates protecting an IP transport based fronthaul based on X.509v3 certificates and IPsec.

In FIG. 2, a situation is illustrated in which the fronthaul is protected by authenticating each port on each leg of the fronthaul path, based on X.509v3 certificates. Instead of MACsec, IPsec is used for protecting the fronthaul, since the fronthaul now includes an element in-between BB and AP. The element may comprise e.g. a fronthaul Ethernet switch. In general, there may be multiple transmission elements involved instead of a single Ethernet switch, in case the fronthaul topology is that of a chain.

An exemplary embodiment applies both for deployments where APs are connected to the base station via direct connections, as illustrated in FIG. 1 (e.g. via Ethernet based on wireless transport, fiber or copper), and to an architecture where active Ethernet fronthaul switches or other intermediate transmission elements are present, as illustrated in FIG. 2. FIG. 2 illustrates a situation with one intermediate element, however, it should be noted that there may be more than one Ethernet fronthaul switches and/or other intermediate transmission elements present in the system.

A certain certificate profile as presented in Table 1 fits Ethernet and IP layer purposes and TLS. Use of a single certificate simplifies deployment of fronthaul protection that may comprise both Ethernet and IP layer protection, and related cryptographic authentication. A secure storage may be needed for the credential in each element.

TABLE 1

|  | 3GPP 33.310 (clause 6.1.1) | IEEE 802.1AR DevID | Resulting requirement |
|---|---|---|---|
| Version | v3 | v3 | v3 |
| RSA key length | at least 2048 bit | Not restricted | at least 2048 bit |
| Hash before signing | SHA-1 and SHA-256 mandatory to support, MD-5 shall not be used. For security reasons, the use of SHA-1 is not recommended for newly created certificates. | SHA-256 (7.3.3) | SHA-256 |
| Subject and issuer name format | C is optional element (C = <country>), O = <Organization Name>, CN = <Some distinguishing name>, organization and CN are in UTF8 format. ou is optional element, cn = <hostname>, (ou = <servers>), dc = <domain> | Not restricted | As in 3GPP 33.310 |
| Signature algorithm | Not restricted | RSASSA-PKCS1-v1_5 or ECDSA | RSASSA-PKCS1-v1_5 or ECDSA |
| Subject name | Not restricted | Recommended to include serial number | Recommended to include serial number |
| SubjectAltName | Not restricted | May supplement subject field identity information as specified in RFC 5280 by containing a hardwareModuleName as specified in RFC 4108 | As in IEEE 802.1AR |

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that IP and/or Ethernet transport. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be ap-plied, an architecture based on LAN network elements, without restricting the embodiment to such an architecture, however. The embodiments described in these examples are not limited to the LAN systems but can also be implemented in other network systems, such as UMTS (universal mobile telecommunications system), LTE, LTE-A, GSM, EDGE, WCDMA, bluetooth network, WLAN or other fixed, mobile or wireless network. In an embodiment, the presented solution may be applied between elements belonging to different but compatible systems such as LAN, WLAN, LTE and UMTS.

Figure 3:
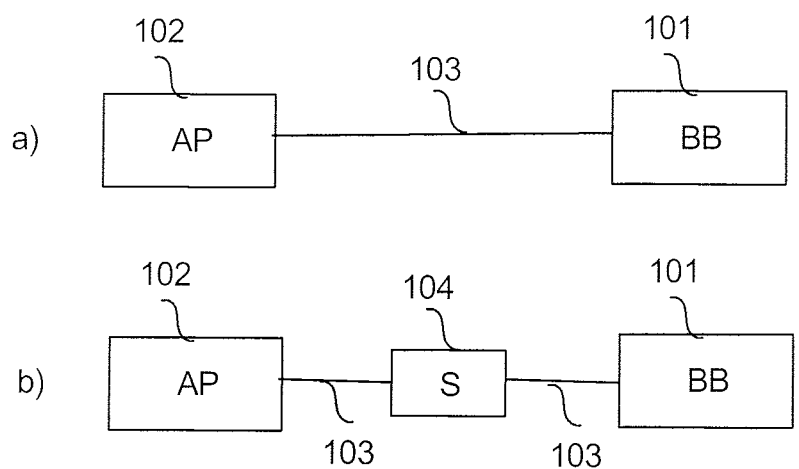
FIG. 3 shows a simplified block diagram illustrating exemplary system architecture.

A general architecture of a communication system is illustrated in FIG. 3. FIG. 3 is a simplified system architecture only showing some elements and functional entities, all being logical units whose implementation may differ from what is shown. The connections shown in FIG. 3 are logical connections; the actual physical connections may be different. It is apparent to a person skilled in the art that the systems also comprise other functions and structures. It should be appreciated that the functions, structures, elements and the protocols used in or for IP/Ethernet transport, are irrelevant to the actual invention. Therefore, they need not to be discussed in more detail here.

The exemplary network system of FIG. 3 comprises a network node 101 of a network operator. The network node 101 may include e.g. a baseband unit BB (as a component of an LTE/LTE-A, 3G/HSPA or 2G base station, or WLAN controller), LTE base station (eNB), 3G/HSPA base station (node-B), 2G base station, radio network controller (RNC), WLAN controller, or any other network element, or a combination of network elements, or a component/subset of a network element. The network node 101 may be connected to one or more core network (CN) elements (not shown in FIG. 3) such as a mobile switching centre (MSC), MSC server (MSS), serving gateway (SGW), mobility management entity (MME), gateway GPRS support node (GGSN), serving GPRS support node (SGSN), home location register (HLR), home subscriber server (HSS), visitor location register (VLR), network management system (NMS), a related mediator element, or to one or more radio network elements (not shown in FIG. 3) such as another baseband unit (of e.g. LTE/LTE-A, 3G/HPSA, 2G and/or WLAN technologies), another component/subset of a base station (of e.g. LTE/LTE-A, 3G/HPSA, 2G or WLAN), to another base station (of e.g. LTE/LTE-A, 3G/HPSA, 2G and/or WLAN), to a radio network controller (e.g. 3G RNC, 2G BSC, or WLAN controller) or to a combination of network elements. FIG. 3 shows one or more access points AP 102 connected to the baseband unit BB 101 via a connection 103. In FIG. 3, the access point 102 which may comprise e.g. a LAN access point, WLAN access point, LTE/LTE-A base station eNB, 3G/HSPA base station (node-B), 2G base station, or a component/subset of a network element (e.g. a radio frequency (RF) unit of LTE/LTE-A eNB, of 3G/HSPA node-B, of 2G BTS, each with or without additional baseband processing functions) or to a combination of network elements, provides one or more user terminals located in the area of the access point 102 with a wireless or wired access to the access point 102. In the example situation of FIG. 3a) the access point 102 and the baseband unit 101 are capable of connecting to each other directly via the connection 103. In the example situation of FIG. 3b) the access point 102 and the baseband unit 101 are capable of connecting to each other via one or more switches S 104 (i.e. "indirectly" via the connection 103).

Figure 4:
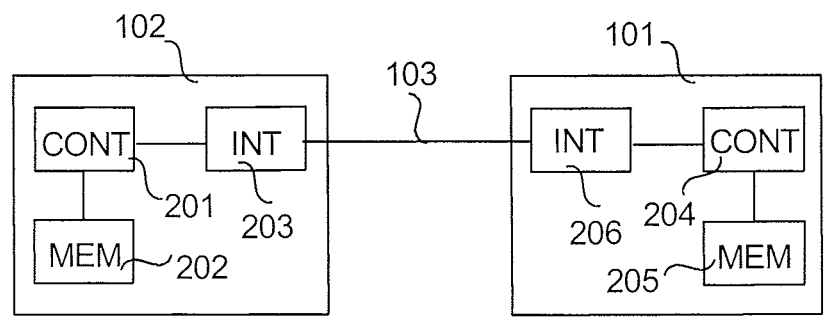
FIG. 4 shows a simplified block diagram illustrating exemplary apparatuses.

FIG. 4 is a block diagram of an apparatus according to an embodiment of the invention. FIG. 4 shows an access point 102 configured to be in connection with a user equipment (UE, not shown). The access point 102 or AP comprises a controller 201 operationally connected to a memory 202. The controller 201 controls the operation of the access point 102. The memory 202 is configured to store software and data. The access point may comprise a transceiver (not shown). The transceiver may be configured to set up and maintain a wireless connection (not shown) to the user equipment (UE). The transceiver may be operationally connected to an antenna arrangement (not shown). The antenna arrangement may comprise a set of antennas. The number of antennas may be two to four, for example. The number of antennas is not limited to any particular number. The access point 102 may be operationally connected (directly or indirectly) to another network element or to another component/subset of a network element of the communication system, such as a baseband unit BB 101 (of e.g. eNB, node-B, or 2G BTS or WLAN controller), to another network element's BB unit (e.g. of another eNB), to another complete base station (of LTE/LTE-A, 3G/HPSA, 2G or WLAN), user equipment (UE), a wireless WLAN controller, radio network controller (RNC), base station controller (BSC), a mobility management entity (MME), a serving gateway (SGW), an MSC server (MSS), a mobile switching centre (MSC), a network management system (NMS), related mediator element, a radio resource management (RRM) node, a gateway GPRS support node, an operations, administrations and maintenance (OAM) node, a home location register (HLR), a visitor location register (VLR), a serving GPRS support node, a gateway, and/or a server or a combination of network elements, via an interface 203.

FIG. 4 shows a baseband unit 101 configured to be in connection 103 with the access point 102. The baseband unit 101 or BB comprises a controller 204 operationally connected to a memory 205. The controller 204 controls the operation of the baseband unit 101. The memory 205 is configured to store software and data. The baseband unit 101 may be operationally connected (directly or indirectly) to another network element of the communication system, such as an access point 102, to one or more core network (CN) elements, such as a mobile switching centre (MSC), MSC server (MSS), serving gateway (SGW), mobility management entity (MME), gateway GPRS support node (GGSN), serving GPRS support node (SGSN), home location register (HLR), home subscriber server (HSS), visitor location register (VLR), an operations, administrations and maintenance (OAM) node, network management system (NMS), or to another radio network elements such as another baseband unit (of e.g. LTE/LTE-A, 3G/HPSA, 2G and/or WLAN technologies), another component/subset of a base station (of e.g. LTE/LTE-A, 3G/HPSA, 2G or WLAN), to another base station (of e.g. LTE/LTE-A, 3G/HPSA, 2G or WLAN), to a radio network controller (e. g. such as 3G RNCs, 2G BSCs, or WLAN controllers), or to a gateway, and/or a server, via an interface 206. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 101, 102, 104 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 101, 102, 104 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware compo-nents that have been programmed in such a way to carry out one or more functions of an embodiment.

The memory 202, 205 may include volatile and/or non-volatile memory and typically stores content, data, or the like. For example, the memory 202, 205 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 5:
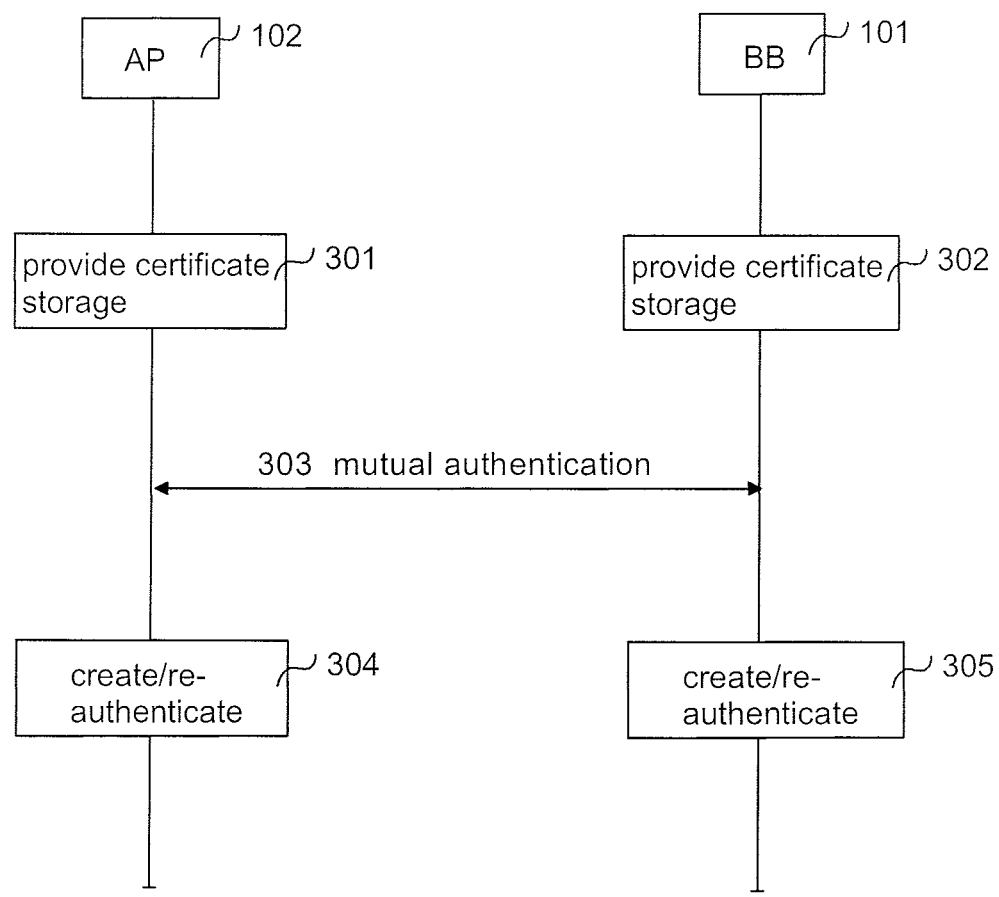
FIG. 5 shows a messaging diagram illustrating an exemplary messaging event according to an embodiment of the invention.

The signalling chart of FIG. 5 illustrates the required signalling. In the example of FIG. 5, in a first apparatus 102 and in a second apparatus 101, a secure storage for an X.509v3 digital certificate is provided in item 301, 302. In item 303, ports of the first apparatus 102 and the second apparatus 101 are mutually authenticated by using IEEE 802.1X port based authentication and IEEE 802.1AR secure device identity certificates, wherein the amount of MAC addresses is limited to a configurable number per port in the first apparatus and the second apparatus (AP, BB). In item 304, 305, traffic types are divided by means of an operator-configurable selector function into user plane, control plane, synchronization plane, and management plane traffic types. According to a first exemplary embodiment, in item 304, 305 for Ethernet transport a virtual port is created for each traffic type, and a different MACsec secure connectivity association CA is created for each virtual port. Further, in item 304, 305 for Ethernet transport an operator-programmable security policy is maintained for each of the traffic types, and a port is repeatedly re-authenticated by means of an operator-definable timer value. According to a second exemplary embodiment, in item 304, 305 for IP transport the first and second apparatus may be authenticated by using an IPsec IKE protocol and a X.509v3 digital certificate, and (subsequently) an IPsec security association is created for each traffic type, and an operator-programmable security policy is maintained for each of the security associations. Further, in item 304, 305 for IP transport, TLS support may be enabled for e.g. compatibility with network management traffic, and/or for other traffic types, and a port is repeatedly re-authenticated by means of an operator-definable timer value, wherein, if MACsec protocol is used, the encryption layer is a MAC layer, and, if IPsec protocol is used, the encryption layer is an IP layer. A fronthaul based on Ethernet only ($1^{st}$ embodiment) or IP only ($2^{nd}$ embodiment) may be used, or it is possible to use a combination of Ethernet and IP (i.e. Ethernet with an IP layer present; a combination of $1^{st}$ and $2^{nd}$ embodiments).

Figure 6:
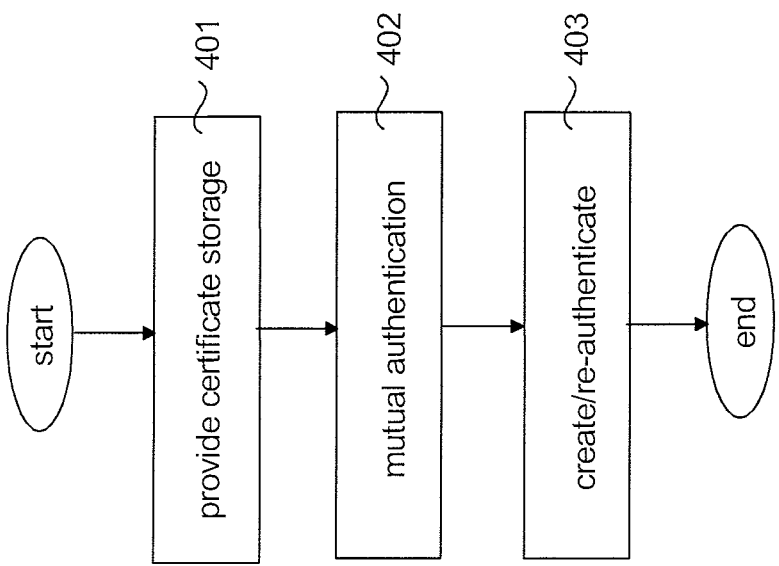
FIG. 6 shows a schematic diagram of a flow chart according to an exemplary embodiment of the invention.

FIG. 6 is a flow chart illustrating an exemplary embodiment. In the first apparatus 102, a secure storage for an X.509v3 digital certificate is provided in item 401. In item 402, ports of the first apparatus 102 and the second apparatus 101 are mutually authenticated by using IEEE 802.1X port based authentication and IEEE 802.1AR secure device identity certificates, wherein the amount of MAC addresses is limited to a configurable number per port in the first apparatus and the second apparatus (AP, BB). In item 403, traffic types are divided by means of an operator-configurable selector function into user plane, control plane, synchronization plane, and management plane traffic types. According to a first exemplary embodiment, in item 403 for Ethernet transport a virtual port is created for each traffic type, and a different MACsec secure connectivity association CA is created for each virtual port. Further, in item 403 for Ethernet transport an operator-programmable security policy is maintained for each of the traffic types, and a port is repeatedly re-authenticated by means of an operator-definable timer value. According to a second exemplary embodiment, in item 403 for IP transport the first and second apparatus may be authenticated by using an IPsec IKE protocol and a X.509v3 digital certificate, and an IPsec security association is created for each traffic type, and an operator-programmable security policy is maintained for each of the security associations. Further, in item 403 for IP transport, TLS support may be enabled e.g. for compatibility with network management traffic, and/or for other traffic types, and a port is repeatedly re-authenticated by means of an operator-definable timer value, wherein, if MACsec protocol is used, the encryption layer is a MAC layer, and, if IPsec protocol is used, the encryption layer is an IP layer. A fronthaul based on Ethernet only ($1^{st}$ embodiment) or IP only ($2^{nd}$ embodiment) may be used, or it is possible to use a combination of Ethernet and IP (i.e. Ethernet with an IP layer present; a combination of $1^{st}$ and $2^{nd}$ embodiments).

Figure 7:
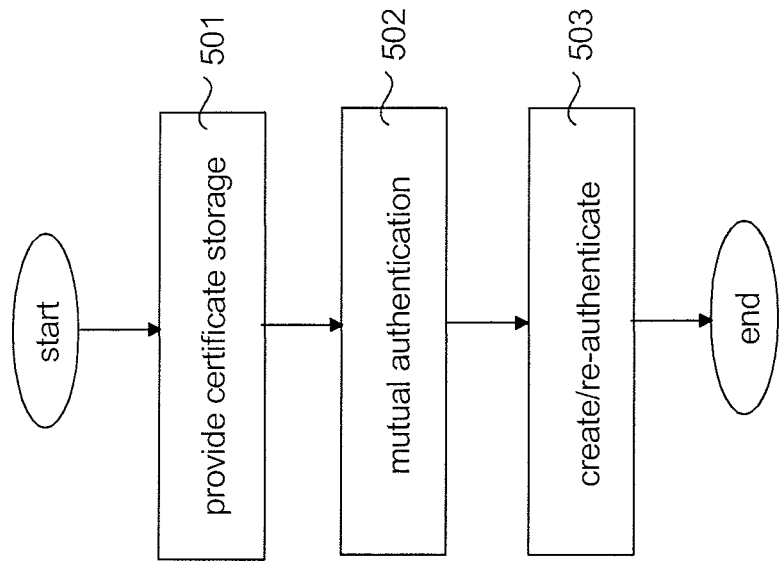
FIG. 7 shows a schematic diagram of a flow chart according to an exemplary embodiment of the invention.

FIG. 7 is a flow chart illustrating an exemplary embodiment. In the second apparatus 101, a secure storage for an X.509v3 digital certificate is provided in item 501. In item 502, ports of the first apparatus 102 and the second apparatus 101 are mutually authenticated by using IEEE 802.1X port based authentication and IEEE 802.1AR secure device identity certificates, wherein the amount of MAC addresses is limited to a configurable number per port in the first apparatus and the second apparatus (AP, BB). In item 503, traffic types are divided by means of an operator-configurable selector function into user plane, control plane, synchronization plane, and management plane traffic types. According to a first exemplary embodiment, in item 503 for Ethernet transport a virtual port is created for each traffic type, and a different MACsec secure connectivity association CA is created for each virtual port. Further, in item 503 for Ethernet transport an operator-programmable security policy is maintained for each of the traffic types, and a port is repeatedly re-authenticated by means of an operator-definable timer value. According to a second exemplary embodiment, in item 503 for IP transport an IPsec security association is created for each traffic type, and an operator-programmable security policy is maintained for each of the security associations. Further, in item 503 for IP transport, TLS support may be enabled e.g. for compatibility with network management traffic, and/or TLS may be enabled for other traffic types, and a port is repeatedly re-authenticated by means of an operator-definable timer value, wherein, if MACsec protocol is used, the encryption layer is a MAC layer, and, if IPsec protocol is used, the encryption layer is an IP layer. A fronthaul based on Ethernet only ($1^{st}$ embodiment) or IP only ($2^{nd}$ embodiment) may be used, or it is possible to use a combination of Ethernet and IP (i.e. Ethernet with an IP layer present; a combination of $1^{st}$ and $2^{nd}$ embodiments).

In an exemplary embodiment, traffic may be divided into traffic types including one or more of user plane, control plane, synchronization plane, management plane, and any other traffic type (e.g. traffic type with a finer granularity). For example, there may be reasons to divide traffic into even more traffic types, e.g. into specific network management traffic types, or into specific user traffic such as QoS dependent traffic type, or into other types.

In an exemplary embodiment, for network management traffic, specific applications or specific traffic may be protected by Ethernet layer (IEEE 802.1x, IEEE 802.1ar, IEEE802.1ae), IP layer (IPsec) or TLS or by another secure protocol, such as ssh, https, secure LDAP, secure FTP, and/or any other suitable protocols. For network management traffic, one or multiple mediator elements may exist, and the protocols used for protecting the traffic may differ between any of the elements on the path between endpoints (endpoints being either AP or BB or both and the network management system). Different network management traffic types may also utilize different protocols for protection.

In an exemplary embodiment, in the fronthaul there may be a need to carry synchronization separately e.g. with IEEE1588-2008.

In an exemplary embodiment, instead of a single fronthaul switch/other transmission equipment in FIG. 2, there may be multiple fronthaul switches/other transmission equipments in the fronthaul. The transmission equipment may include an Ethernet switch and/or any other transmission element, such as a microwave radio or fiber transmission equipment. Thus, in an exemplary embodiment, transmission/transport equipment other than Ethernet switches may be used. The fronthaul switch(es)/other transmission (transport) equipment(s) in FIG. 2 may also be referred to as an intermediate device (intermediate devices).

In an exemplary embodiment, it may be possible to have the interface between BB and AP based on Ethernet, without CPRI or OBSAI. In that case the traffic is mapped into Ethernet frames without a CPRI or OBSAI format.

The steps/points, signalling messages and related functions de-scribed above in FIGS. 1 to 7 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for providing network security in a communications system, the method comprising providing, in a first apparatus and in a second apparatus, a secure storage for an X.509v3 digital certificate; mutually authenticating ports of the first apparatus and the second apparatus by using 802.1X port based authentication and 802.1AR secure device identity certificates, wherein the amount of MAC addresses is limited to a configurable number per port in the first apparatus and the second apparatus; dividing traffic types by means of an operator-configurable selector function into at least one of user plane, control plane, synchronization plane, management plane and/or a further traffic type; wherein for Ethernet transport the method comprises creating a virtual port for each traffic type; creating a different MACsec secure connectivity association CA for each virtual port; maintaining an operator-programmable security policy for each of the traffic types; repeatedly re-authenticating a port by means of an operator-definable timer value.

According to another exemplary embodiment, there is provided a method for providing network security in a communications system, the method comprising providing, in a first apparatus and in a second apparatus, a secure storage for an X.509v3 digital certificate; mutually authenticating ports of the first apparatus and the second apparatus by using 802.1X port based authentication and 802.1AR secure device identity certificates, wherein the amount of MAC addresses is limited to a configurable number per port in the first apparatus and the second apparatus; dividing traffic types by means of an operator-configurable selector function into at least one of user plane, control plane, synchronization plane, and management plane and/or a further traffic type; wherein for IP transport the method comprises authenticating the first and second apparatus by using an IPsec IKE protocol and a X.509v3 digital certificate; creating an IPsec security association for each traffic type; maintaining an operator-programmable security policy for each of the security associations; repeatedly re-authenticating a port by means of an operator-definable timer value; wherein, if MACsec protocol is used, the encryption layer is a MAC layer, and, if IPsec protocol is used, the encryption layer is an IP layer.

According to yet another exemplary embodiment, when intermediate devices are used, trunk links between a baseband apparatus and switches as well as trunk links between the intermediate devices are mutually authenticated.

According to yet another exemplary embodiment, when intermediate devices are used, access point port authentication is performed by the intermediate devices.

According to yet another exemplary embodiment, the operator-programmable security policy includes null encryption intended for user plane.

According to yet another exemplary embodiment, for Ethernet transport, if needed, a secure storage for the X.509v3 digital certificate is provided in one or more intermediate devices.

According to yet another exemplary embodiment, for Ethernet transport, control plane traffic is directed to the MACsec secure connectivity association CA.

According to yet another exemplary embodiment, for IP transport, control plane traffic is directed to the IPsec security association.

According to yet another exemplary embodiment, there is provided a method for securing user plane, control plane, synchronization plane, management plane traffic and/or another type of traffic of an access point by using an Ethernet layer security protocol, IP layer security protocol, application layer security protocol, and/or transport layer security TLS protocol.

According to yet another exemplary embodiment, the operator-programmable security policy includes topology information and neighborhood information of each baseband unit, intermediate device and access point involved.

According to yet another exemplary embodiment, for IP transport, TLS support is enabled for compatibility with one or more of user traffic, control traffic, synchronization traffic, and network management traffic, including authentication of a TLS peer by using the X.509v3 digital certificate.

According to yet another exemplary embodiment, there is provided a first apparatus comprising at least one processor; and at least one memory including a computer program code, wherein the at least one memory and the computer program code are configured to, with the at least one processor, cause the first apparatus to provide a secure storage for an X.509v3 digital certificate; mutually authenticate ports of the first apparatus and a second apparatus by using 802.1X port based authentication and 802.1AR secure device identity certificates, wherein the amount of MAC addresses is limited to a configurable number per port in the first apparatus and in the second apparatus; divide traffic types by means of an operator-configurable selector function into at least one of user plane, control plane, synchronization plane, and management plane and/or a further traffic type; wherein for Ethernet transport the at least one memory and the computer program code are configured to, with the at least one processor, cause the first apparatus to create a virtual port for each traffic type; create a different MACsec secure connectivity association CA for each virtual port; maintain an operator-programmable security policy for each of the traffic types; repeatedly re-authenticate a port by means of an operator-definable timer value.

According to yet another exemplary embodiment, the at least one memory and the computer program code are configured to, with the at least one processor, cause the first apparatus to, when intermediate devices are used, mutually authenticate trunk links between a baseband apparatus and switches as well as trunk links between the intermediate devices.

According to yet another exemplary embodiment, the at least one memory and the computer program code are configured to, with the at least one processor, cause the first apparatus to perform, when intermediate devices are used, access point port authentication by the intermediate devices.

According to yet another exemplary embodiment, the operator-programmable security policy includes null encryption intended for user plane.

According to yet another exemplary embodiment, the at least one memory and the computer program code are configured to, with the at least one processor, cause the first apparatus to provide if needed a secure storage for the X.509v3 digital certificate in one or more intermediate devices.

According to yet another exemplary embodiment, the at least one memory and the computer program code are configured to, with the at least one processor, cause the first apparatus to direct control plane traffic to the MACsec secure connectivity association CA.

According to yet another exemplary embodiment, there is provided a second apparatus comprising at least one processor; and at least one memory including a computer program code, wherein that the at least one memory and the computer program code are configured to, with the at least one processor, cause the second apparatus to provide, in a first apparatus and in the second apparatus, a secure storage for an X.509v3 digital certificate; mutually authenticate ports of the first apparatus and the second apparatus by using 802.1X port based authentication and 802.1AR secure device identity certificates, wherein the amount of MAC addresses is limited to a configurable number per port in the first apparatus and the second apparatus; divide traffic types by means of an operator-configurable selector function into at least one of user plane, control plane, synchronization plane, and management plane and/or a further traffic type; wherein for IP transport the at least one memory and the computer program code are configured to, with the at least one processor, cause the second apparatus to authenticate the first and second apparatus by using an IPsec IKE protocol and a X.509v3 digital certificate; create an IPsec security association for each traffic type; maintain an operator-programmable security policy for each of the security associations; repeatedly re-authenticate a port by means of an operator-definable timer value; wherein, if MACsec protocol is used, the encryption layer is a MAC layer, and, if IPsec protocol is used, the encryption layer is an IP layer.

According to yet another exemplary embodiment, the at least one memory and the computer program code are configured to, with the at least one processor, cause the second apparatus to mutually authenticate, when intermediate devices are used, trunk links between a baseband apparatus and switches as well as trunk links between intermediate devices.

According to yet another exemplary embodiment, the at least one memory and the computer program code are configured to, with the at least one processor, cause the second apparatus to perform, when one or more intermediate devices are used, access point port authentication by the switches.

According to yet another exemplary embodiment, the operator-programmable security policy includes null encryption intended for user plane.

According to yet another exemplary embodiment, the at least one memory and the computer program code are configured to, with the at least one processor, cause the second apparatus to direct control plane traffic to the IPsec security association.

According to yet another exemplary embodiment, the at least one memory and the computer program code are configured to, with the at least one processor, cause the second apparatus to enable TLS support for compatibility with one or more of user traffic, control traffic, synchronization traffic, and network management traffic, including authentication of a TLS peer by using the X.509v3 digital certificate.

According to yet another exemplary embodiment, there is provided an apparatus that comprises an access point.

According to yet another exemplary embodiment, there is provided an apparatus that comprises a baseband unit.

According to yet another exemplary embodiment, the at least one memory and the computer program code are configured to, with the at least one processor, cause the apparatus to secure user plane, control plane, synchronization plane, management plane traffic and/or another type of traffic of an access point by using an Ethernet layer security protocol, IP layer security protocol, application layer security protocol, and/or transport layer security TLS protocol.

According to yet another exemplary embodiment, the at least one memory and the computer program code are configured to, with the at least one processor, cause the apparatus to use Ethernet framing without CPRI/OBSAI, by mapping user, control, synchronization, and/or management plane traffic directly into Ethernet frames.

According to yet another exemplary embodiment, the at least one memory and the computer program code are configured to, with the at least one processor, cause the apparatus to use IPsec without CPRI/OBSAI, by mapping user, control, synchronization, and/or management plane traffic directly into IP packets.

According to yet another exemplary embodiment, the intermediate device comprises a fronthaul switch, a microwave radio and/or fiber transmission equipment.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

ARP address resolution protocol
EAP extensible authentication protocol
eNB evolved node-B
IPsec IP security
LTE long term evolution
MAC media access control
PKI public key infrastructure
SEG security gateway
VLAN virtual LAN
LAN local area network
IP internet protocol
AP access point
BB baseband unit
TLS transport layer security

The invention claimed is:

1. A method of providing network security in a communications system, said method comprising:
providing, in a first apparatus and in a second apparatus, a secure storage for an X.509v3 digital certificate;
mutually authenticating ports of the first apparatus and the second apparatus by using IEEE 802.1X port based authentication and IEEE 802.1AR secure device identity certificates, wherein a number of media access control (MAC) addresses is limited to a configurable number per port in the first apparatus and the second apparatus;
dividing traffic types using an operator-configurable selector function into at least one of user plane, control plane, synchronization plane, and management plane traffic types, or one or more further traffic types;
wherein for Ethernet transport, the method comprises:
creating a virtual port for each selected traffic type;
creating a different media access control security (MACsec) secure connectivity association (CA) for each virtual port;
maintaining an operator-programmable security policy for each of the selected traffic types; and
repeatedly re-authenticating a port by means of an operator-definable timer value.

2. A method of providing network security in a communications system, said method comprising:
providing, in a first apparatus and in a second apparatus, a secure storage for an X.509v3 digital certificate;
mutually authenticating ports of the first apparatus and the second apparatus by using IEEE 802.1X port based authentication and IEEE 802.1AR secure device identity certificates, wherein a number of media access control (MAC) addresses is limited to a configurable number per port in the first apparatus and the second apparatus;
dividing traffic types using an operator-configurable selector function into at least one of user plane, control plane, synchronization plane and management plane traffic types, or one or more further traffic types;
wherein for internet protocol (IP) transport, the method comprises:
authenticating the first and second apparatus by using an internet protocol security (IPsec) internet key exchange (IKE) protocol and a X.509v3 digital certificate;
creating an IPsec security association for each selected traffic type;
maintaining an operator-programmable security policy for each of the security associations;
repeatedly re-authenticating a port using an operator-definable timer value;
wherein, if media access control security (MACsec) protocol is used, the encryption layer is a MAC layer, and, if IPsec protocol is used, the encryption layer is an IP layer.

3. The method as claimed in claim 1, wherein when intermediate devices are used, trunk links between a baseband apparatus and an intermediate device as well as trunk links between the intermediate devices are mutually authenticated.

4. The method as claimed in claim 1, wherein when one or more intermediate devices are used, access point port authentication is performed by the one or more intermediate devices.

5. The method as claimed in claim 1, wherein the operator-programmable security policy includes null encryption intended for user plane.

6. The method as claimed in claim 1, further comprising, for Ethernet transport, providing if needed a secure storage for the X.509v3 digital certificate in one or more intermediate devices.

7. The method as claimed in claim 1, wherein for Ethernet transport control plane traffic is directed to the MACsec secure CA.

8. The method as claimed in claim 2, wherein for IP transport control plane traffic is directed to the IPsec security association.

9. The method as claimed in claim 1, wherein the operator-programmable security policy includes topology information and neighborhood information of each baseband unit, intermediate device and access point involved.

10. A first apparatus, comprising:
at least one processor; and
at least one memory including computer program code, wherein the at least one memory and the computer program code are configured to, with the at least one processor, cause the first apparatus to:
provide a secure storage for an X.509v3 digital certificate;
mutually authenticate ports of the first apparatus and a second apparatus by using IEEE 802.1X port based authentication and IEEE 802.1AR secure device identity certificates, wherein a number of media access control (MAC) addresses is limited to a configurable number per port in the first apparatus and in the second apparatus;
divide traffic types using an operator-configurable selector function into at least one of user plane, control plane, synchronization plane, and management plane traffic types, or one or more further traffic types;
wherein, for Ethernet transport, the at least one memory and the computer program code are configured to, with the at least one processor, cause the first apparatus to
create a virtual port for each selected traffic type;
create a different media access control security (MACsec) secure connectivity association (CA) for each virtual port;
maintain an operator-programmable security policy for each of the selected traffic types; and
repeatedly re-authenticate a port by means of an operator-definable timer value.

11. The first apparatus as claimed in claim 10, wherein the at least one memory and the computer program code are configured to, with the at least one processor, cause the first apparatus to, when intermediate devices are used, mutually authenticate trunk links between a baseband apparatus and an intermediate device as well as trunk links between the intermediate devices.

12. The first apparatus as claimed in claim 10, wherein the at least one memory and the computer program code are configured to, with the at least one processor, cause the first apparatus to perform, when one or more intermediate devices are used, access point port authentication by the one or more intermediate devices.

13. The first apparatus as claimed in claim 10, wherein the operator-programmable security policy includes null encryption intended for user plane.

14. The first apparatus as claimed in claim 10, wherein the at least one memory and the computer program code are configured to, with the at least one processor, cause the first apparatus to direct control plane traffic to the MACsec secure CA.

15. A second apparatus, comprising:
at least one processor; and
at least one memory including computer program code, wherein the at least one memory and the computer program code are configured to, with the at least one processor, cause the second apparatus to:
provide, in a first apparatus and in the second apparatus, a secure storage for an X.509v3 digital certificate;
mutually authenticate ports of the first apparatus and the second apparatus by using IEEE 802.1X port based authentication and IEEE 802.1AR secure device identity certificates, wherein a number of media access control (MAC) addresses is limited to a configurable number per port in the first apparatus and the second apparatus;
divide traffic types using an operator-configurable selector function into at least one of user plane, control plane, synchronization plane, and management plane traffic types, or one or more further traffic types;
wherein for internet protocol (IP) transport the at least one memory and the computer program code are configured to, with the at least one processor, cause the second apparatus to:
authenticate the first and second apparatus by using an internet protocol security (IPsec) internet key exchange (IKE) protocol and a X.509v3 digital certificate;
create an IPsec security association for each selected traffic type;
maintain an operator-programmable security policy for each of the security associations;
repeatedly re-authenticate a port by means of an operator-definable timer value,
wherein, if media access control security (MACsec) protocol is used, the encryption layer is a MAC layer, and, if IPsec protocol is used, the encryption layer is an IP layer.

16. The second apparatus as claimed in claim 15, wherein the at least one memory and the computer program code are configured to, with the at least one processor, cause the second apparatus to mutually authenticate, when intermediate devices are used, trunk links between a baseband apparatus and an intermediate device as well as trunk links between the intermediate devices.

17. The second apparatus as claimed in claim 15, wherein the at least one memory and the computer program code are configured to, with the at least one processor, cause the second apparatus to direct control plane traffic to the IPsec security association.

18. The second apparatus as claimed in claim 15, wherein the at least one memory and the computer program code are configured to, with the at least one processor, cause the second apparatus to enable transport layer security (TLS) support for compatibility with one or more of user traffic, control traffic, synchronization traffic, and network management traffic, including authentication of a TLS peer by using the X.509v3 digital certificate.

19. The apparatus as claimed in claim 15, wherein the at least one memory and the computer program code are configured to, with the at least one processor, cause the apparatus to use Ethernet framing without common public radio interface (CPRI)/open base station architecture initiative (OBSAI), by mapping user, control, synchronization, and/or management plane traffic directly into Ethernet frames.

20. The apparatus as claimed in claim 15, wherein the at least one memory and the computer program code are configured to, with the at least one processor, cause the apparatus to use IPsec without common public radio interface (CPRI)/open base station architecture initiative (OBSAI), by mapping user, control, synchronization, and/or management plane traffic directly into IP packets.

* * * * *